(12) United States Patent
Li et al.

(10) Patent No.: US 6,861,164 B2
(45) Date of Patent: Mar. 1, 2005

(54) ENVIRONMENTAL AND THERMAL BARRIER COATING FOR CERAMIC COMPONENTS

(75) Inventors: Chien-Wei Li, Livingston, NJ (US); Derek Raybould, Denville, NJ (US); Liang A. Xue, Randolph, NJ (US)

(73) Assignee: Honeywell International, Inc., Morristown, NJ (US)

( * ) Notice: Subject to any disclaimer, the term of this patent is extended or adjusted under 35 U.S.C. 154(b) by 45 days.

(21) Appl. No.: 09/990,640

(22) Filed: Nov. 21, 2001

(65) Prior Publication Data

US 2002/0136835 A1 Sep. 26, 2002

Related U.S. Application Data

(60) Provisional application No. 60/278,102, filed on Mar. 23, 2001.

(51) Int. Cl.$^7$ .................................................. B32B 9/04
(52) U.S. Cl. ........................ 428/698; 428/446; 428/448; 428/704; 428/701; 428/702; 427/453; 427/314; 427/376.2
(58) Field of Search ................................ 428/432, 446, 428/448, 447, 697, 698, 699, 700, 701, 702, 704; 416/241 R, 241 B; 427/453, 299, 314, 374.1, 376.2

(56) References Cited

U.S. PATENT DOCUMENTS 3,942,293 A * 3/1976 Cook
4,340,508 A 7/1982 Wahlers et al.
4,492,522 A 1/1985 Rossmann et al.
4,643,648 A 2/1987 Huller
4,670,355 A * 6/1987 Matsudaira
4,973,526 A * 11/1990 Haluska
4,976,806 A * 12/1990 Iwamoto et al.
5,578,349 A 11/1996 Koshkarian et al.
5,914,189 A 6/1999 Hasz et al.
6,159,553 A 12/2000 Li et al.
6,210,791 B1 * 4/2001 Skoog et al.
6,582,779 B2 * 6/2003 Li et al.

FOREIGN PATENT DOCUMENTS

EP  0 442 632 A2  8/1991
WO  WO 01/10795 A1  2/2001

OTHER PUBLICATIONS

K.M.A. Salam, et al., "Reduction of Leakage Current of Crystallized Ta2O5 Through Substitution with TiO2", Extended Abstracts of International Workshop on Gate Insulator, 1$^{st}$, Tokyo, Japan, Nov. 1 and 2, 2001, 192–195, Database: CA Online!, Chemical Abstracts Service.

* cited by examiner

Primary Examiner—Jennifer McNeil
(74) Attorney, Agent, or Firm—Robert Desmond, Esq.

(57) ABSTRACT

A component comprises a silicon-based substrate; and a protective coating for the substrate. The protective coating includes tantalum oxide ($Ta_2O_5$) and an additive for suppressing transformation from beta $Ta_2O_5$ to alpha $Ta_2O_5$.

25 Claims, 1 Drawing Sheet

ENVIRONMENTAL AND THERMAL BARRIER COATING FOR CERAMIC COMPONENTS

CROSS REFERENCE TO RELATED APPLICATIONS

This application claims the benefit of U.S. Provisional Application Ser. No. 60/278,102, filed Mar. 23, 2001.

BACKGROUND

The present invention relates to protective coatings for ceramic materials.

Advanced turbomachines use silicon (Si)-based ceramics such as silicon nitride, silicon carbide, and their composites for hot-section components. Due to the high temperature capability of Si-based ceramics, those ceramic turbomachines operate at higher temperatures with minimum cooling and higher engine performance. However, at operating temperatures above 1200° C., the Si-based ceramics can be adversely affected by oxidation and water vapor present in the flow stream. Such a hostile engine environment results in rapid recession of Si-based ceramics parts.

U.S. Pat. No. 6,159,553 discloses the use of tantalum oxide ($Ta_2O_5$) as coating material on silicon nitride parts. A tantalum oxide coating of 2 to 500 microns in thickness can effectively protect the surface of silicon nitride pans from oxidation and reacting with water vapor at high temperatures. However, there are some limitations on pure tantalum oxide coating on Si-based parts:

1. $Ta_2O_5$ undergoes a phase transformation from low temperature phase (beta-phase) to high temperature phase (alpha-phase) at about 1350° C., which may cause cracking in the coating due to the volume change occurred during the phase transformation.

2. $Ta_2O_5$ is susceptible to grain growth at temperatures above 1200° C. Pronounced grain growth results in large grain microstructure, which reduces the mechanical strength of the coating and induces high local residual stresses in the coating, and causes the coating to spall off.

3. $Ta_2O_5$ has a coefficient of thermal expansion (CTE) about $3 \times 10^{-6}$ °$C.^{-1}$, whereas silicon nitride has a CTE in the range of $3-4 \times 10^{-6}$ °$C.^{-1}$ and silicon carbide (SiC) has a CTE in the range of $4-5 \times 10^{-6}$ °$C^{-1}$. Since there is about 10 to 30% CTE mismatch between $Ta_2O_5$ and silicon nitride, and an even higher CTE mismatch between $Ta_2O_5$ and silicon carbide, residual stresses will develop in the $Ta_2O_5$ coating on Si-based ceramics. The residual stresses can limit the service life of the coating.

4. A pure $Ta_2O_5$ coating has low fracture toughness, which may adversely affect the mechanical integrity and the lifetime of the coating during service due to foreign object impact and particulate erosion events.

With those limitations, a $Ta_2O_5$ coating on Si-based ceramics would not provide adequate protection for turbine engine applications in which the maximum temperature goes above 1350° C., thousands of thermal cycles occur, and greater than five thousand (5000) hour coating lifetime is required. It would be highly desirable to significantly improve the $Ta_2O_5$ coating to meet those stringent demands for advanced ceramic turbine engine applications.

SUMMARY

According to one aspect of the present invention, a component comprises a silicon-based substrate; and a protective coating for the substrate. The protective coating includes tantalum oxide ($Ta_2O_5$) and an additive for suppressing transformation from beta $Ta_2O_5$ to alpha $Ta_2O_5$.

DETAILED DESCRIPTION

The present invention relates to $Ta_2O_5$-based coatings which can effectively protect Si-based ceramic turbine engine parts even when repeatedly subjected to extreme temperatures during operation. The coating compositions have improved microstructural and high temperature stability as compared to pure $Ta_2O_5$ when utilized to protect Si-based ceramic parts in turbine engine applications.

Applicants have found that the grain growth rate of $Ta_2O_5$ is reduced by the addition of alumina at temperatures above 1400° C. It is believed that the $Al_2O_3$ solid solution in $Ta_2O_5$ changes the defect structure of $Ta_2O_5$ such that ionic diffusion rate is slowed and that the transformation of beta to alpha $Ta_2O_5$, which triggers exaggerated grain growth at temperatures greater than 1350° C., is suppressed by the presence of $Al_2O_3$.

Applicants have found that the sintering property of $Ta_2O_5$ is also improved with the addition of alumina. Pressed pellets containing between 1.0 to about 10 mol % of $Al_2O_3$ have shown noticeably higher density than pure $Ta_2O_5$ pellets sintered under the same condition. This improved sinterability is believed to be due to the reduction of $Ta_2O_5$ grain coarsening rate by the $Al_2O_3$ addition, and/or the enhancement of Ta ion lattice diffusion as the number of cation vacancies is increased by the diffusion kinetics due to the presence of Al ions.

The solid solubility of $Al_2O_3$ in $Ta_2O_5$ may be about 10 mol % at about 1500° C. Since alpha-$Al_2O_3$ has a CTE about $8 \times 10^{-6}$ °$C.^{-1}$, the CTE of a 10 mol % $Al_2O_3$–90 mol % $Ta_2O_5$ alloy would be about $3.5 \times 10^{-6}$ °$C.^{-1}$, which is 10% higher than the pure $Ta_2O_5$ and closer to the CTE of silicon nitride. When the amount of $Al_2O_3$ in $Ta_2O_5$ exceeds about 10 mol % a second phase having the formula of $AlTaO_4$ forms that has a CTE about $5 \times 10^{-6}$ °$C.^{-1}$. As the alloy composition increases to 25 mol % $Al_2O_3$–75 mol % $Ta_2O_5$, the microstructure includes a mixture of $Ta_2O_5$–$Al_2O_3$ solid solution and the $AlTaO_4$ compound, and the CTE is about $4 \times 10^{-6}$ °$C.^{-1}$, which matches well with that of SiC. If the $Al_2O_3$ concentration exceeds 25 mol %, the CTE of the coating would become too high for application on $Si_3N_4$ substrate. For SiC and its composites having CTE in the range of $4-5 \times 10^{-6}$ °$C.^{-1}$, the $Ta_2O_5$ coating can incorporate up to 50 mol % $Al_2O_3$ so that the majority of the phase in the coating becomes $AlTaO_4$ and the CTE match very well with the substrate.

Figure 1:
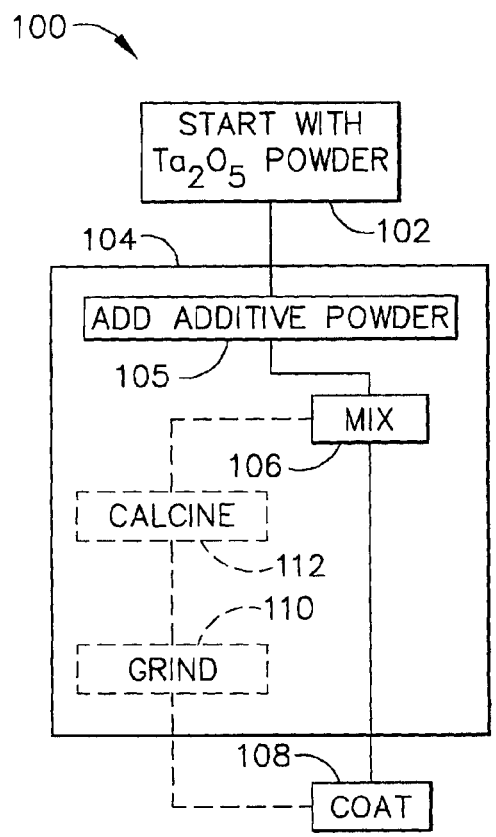
FIG. 1 illustrates a first method of improving the crystalline structure of a coating composition.

A variety of ceramic processing methods can be used to introduce and incorporate the additives into $Ta_2O_5$. As shown by the method 100 in FIG. 1, the process may start with a commercially available $Ta_2O_5$ powder (step 102), to which a desirable amount (about 1–50 mol. %) of additives are added (step 105). The additives or their precursors can be in the form of powders that require only simple (either dry or wet) mixing with the $Ta_2O_5$ powder (step 106). After mixing (and drying, if wet mixing in a liquid medium is performed) the mixture 120 is ready for coating operation 108. Optionally, the mixture is subject to calcination (step 110) in which the mixture is heat-treated to a temperature up to 1600° C., after which with or without milling or grinding (step 112), before the coating operation. Coating is then performed (step 108), as described below.

Figure 2:
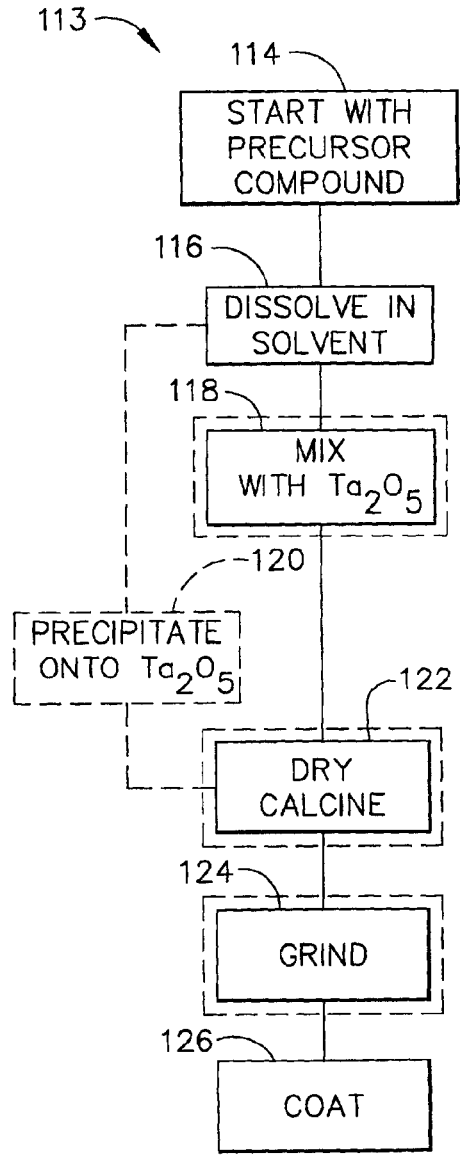
FIG. 2 illustrates a second method of improving the crystalline structure of a coating composition.

Referring to FIG. 2, an alternative method 113 of applying the additives includes starting with precursor compounds (either solids or liquids) containing the additive ions (step 114). The precursor compounds are dissolved in a solvent such as water or an alcohol 116 (step 116), mixed with $Ta_2O_5$ powder (step 118), (alternatively, the $Ta_2O_5$ powder can be dispersed in the solvent first, and added with the precursors), and then precipitated onto the surface of the $Ta_2O_5$ particles (step 120). After drying (step 122), calcination (step 122), and/or milling/grinding (step 124), the mixture is then ready for the coating operation 126.

The coating operation (step 108, 126) for applying the mixture created by either of the methods 100 or 113 may include plasma spray, sol gel, and chemical vapor deposition. Moreover, the coating can be formed by sintering pressed ingots or similar components at about 1350° C. for 1 to about 20 hours, and using Physical Vapor Deposition, (PVD) or Electron Beam Physical Vapor Deposition (EB-PVD) methods, the latter being well known in the field of thermal barrier coating on super alloy turbine engine parts. Both PVD and EB-PVD coatings have the benefit of forming a smooth surface, allowing strong bonding to the substrate, and uniform additive distribution.

The additive is not limited to an oxide of aluminum. The additive for the coating may include one or more of other oxides, compounds, or their precursors of Al, Hf, Si, Ln (rare earth including whole lanthanum series and Y) Mg, Mo, Ni, Nb, Sr, Ti, and/or Zr. Those additives may affect the CTE of tantalum oxide, mostly shifting it higher. An additive such as $La_2O_3$ can induce an acicular-grain-shaped second phase having the formula $La_2Ta_{12}O_{33}$, and thereby produce a duplex microstructure that results in a strong material with high toughness. Additional additives (e.g., nitrides, carbides, borides, silicides) can be introduced to further inhibit grain growth, modify CTE, and reinforce tantalum oxide. These additives result in lower grain growth, higher CTE and increased fracture toughness.

Figure 3:
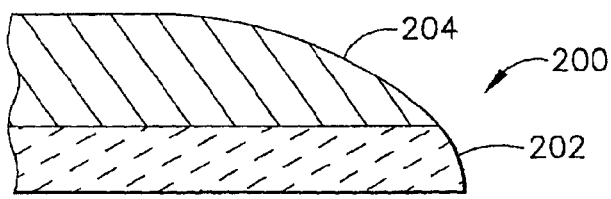
FIG. 3 is a schematic view of component formed in accordance with the present invention.

FIG. 3 shows a component 200 formed in accordance with the present invention. Component 200 includes a substrate 202 which may be formed of Si-based material such as a SiC—SiC composite material. A thermal protective coating layer 204 is applied to the outer surface of substrate 202 as described above.

The coating layer 204 may be formed of a mixture of $Ta_2O_5$ and one or more additives including $Al_2O_3$ or $La_2O_3$. The coating thickness can be accurately controlled by EB-PVD techniques and may vary between 0.5 to 10 mil.

During application, the additive(s) in the coating layer 204 may go into solid solution of form compounds with the tantalum oxide. Therefore, the amount of additive(s) in the finished component may be different than the amount of the starting material.

EXAMPLES

Example 1

Compositions having 1, 10 and 25 mol % $Al_2O_3$ as the additive to $Ta_2O_5$ were prepared. In each batch, about 1 Kg of a commercial beta $Ta_2O_5$ powder was mixed with commercial $Al_2O_3$ powder in isopropanol in a milling jar for about 2 hours before drying. After drying was complete, the powder was sieved to classify the particle size to about 5 to 100 micron range in preparation for plasma spray coating. If the particle size was too fine, a calcining process was included to coarsen the particles. A coating of the above composition was then applied to coupons of silicon nitride and SiC—SiC composite substrates by an air plasma spraying process. The silicon nitride coupons had an as-sintered surface on which the plasma coating was applied. Alternatively, a grit-blasted machine surface could have been utilized. The coupons were then degreased, and preheated to about 1000° C. by either a torch or furnace. The powder was then fed into a high velocity, high temperature plasma air flow. The ceramic powder became molten and subsequently was quenched and solidified onto the coupons. The coating thickness varied from about 2 to about 10 mil, or about 50 to about 250 microns. The coated samples were then subjected to cyclic furnace testing wherein each sample was held in the furnace at about 1315° C. for about 30 minutes, and then quickly removed from the furnace and quenched to about 200° C. in a stream of blowing air. The silicon nitride coupons coated with $Al_2O_3$ in the range of about 1 to 25 mol % survived about 100 hours and 200 cycles without spalling. X-ray diffraction showed the $Ta_2O_5$ remained in the beta phase.

Example 2

Compositions having 3, 4, 6 and 10 mol % $La_2O_3$ as the additive to $Ta_2O_5$ were prepared. In each batch, about 1 Kg of a commercial beta $Ta_2O_5$ powder was mixed with commercial $La_2O_3$ powder in isopropanol in a milling jar for about 2 hours before drying. After drying was completed, the powder was sieved to classify the particle size to about 5 to 100 micron range in preparation for a plasma spray coating. The composition was applied to coupons of silicon nitride and SiC—SiC composite substrate by air-plasma spray process. The silicon nitride coupons had as-sintered surfaces on which the plasma coating was applied. Alternatively, a grit-blasted machine surface could have been utilized The coupons were then degreased, and preheated to about 1000° C. by either a torch or furnace. The powder was then fed into a high velocity, high temperature plasma air flow. The ceramic powder became molten and subsequently was quenched and solidified onto the coupons. The coating thickness varied from about 2 to about 10 mil, or about 50 to about 250 microns. The coated samples were then subjected to cyclic furnace testing wherein each sample was held in the furnace at 1315° C. for about 30 minutes, and then quickly removed from the furnace and quenched to about 200° C. by a stream of blowing air. The silicon nitride samples coated with $La_2O_3$ in the range of 3 to 6 mol % survived more than 1000 hours and 2000 cycles at 1315° C. The SiC—SiC samples having $La_2O_3$ in the range with 4, 6 and 10 mol % survived more than 2,000 hrs and 4,000 cycles. SEM examination showed needle-shaped $La_2O_3$–$Ta_2O_5$ precipitates on the coating surface. X-ray diffraction showed the existence of a second phase containing La, possibly the $La_2Ta_{12}O_{33}$ phase according to the phase diagram. These needle-shaped second phases distributed uniformly throughout the coating increased the fracture toughness and mechanical strength of the coating. They also increased the CTE of the coating such that the CTE mismatch between the coating and the substrate was significantly reduced, resulting in improved coating life performance as shown by repeated heating during the cyclic furnace testing.

Example 3

The SiC—SiC coupon coating was prepared with a 50-mol % $Al_2O_3$ addition in the same manner as Example 1 which survived the same cycle furnace testing for over 100 hours without spalling. After the testing, the coating has transformed to the $AlTaO_4$ phase with some residual $Ta_2O_5$. Silicon nitride coating coupons having coating compositions of 10 mol % $Al_2O_3$–90 mol % $Ta_2O_5$ survived 500 hours at 1315° C. and 1000 cycles without spalling. X-ray diffraction of the tested sample shows that the predominant phase in the coating remains the beta $Ta_2O_5$ with some $AlTaO_4$ phase.

Example 4

Two coating compositions, 1 mol % $Al_2O_3$–99 mol % $Ta_2O_5$ and 5 mol % $Al_2O_3$–95% $Ta_2O_5$, were heat-treated at 1450° C. for 2 hours. X-ray diffraction showed that the samples remained predominantly beta $Ta_2O_5$ after the heat treatment. In contrast pure beta $Ta_2O_5$ completely transformed to alpha $Ta_2O_5$ after a heat treatment of 1 hour at 1450° C. Scanning electron microscope examination showed that the grain size for the 5 mol % $Al_2O_3$ coating composition fired at 1450° C. was significantly smaller than the pure $Ta_2O_5$ sample fired at the same temperature. The coating composition of 5 mol % $Al_2O_3$–95 mol % $Ta_2O_5$ was further heated at 1550° C. for 15 hours, and the $Ta_2O_5$ remained as beta phase after the heat treatment.

Example 5

Powders of two compositions, 7.5 mol % $Al_2O_3$–92.5 mol % $Ta_2O_5$ and 4 mol % $La_2O_3$–96 mol % $Ta_2O_5$, respectively, were pressed into cylindically-shaped green parts and sintered at 1350° C. for 10 hours to form ingots for EB-PVD coating. Substrates of silicon nitride and SiC—SiC composites were loaded in a vacuum chamber and an electron beam was focused on an ingot of the material to be deposited. The electron bombardment resulted in high local heating on the coating material, which evaporated atomistically and condensed onto the part. Oxygen gas was bled into the system to compensate for the loss of oxygen from $Ta_2O_5$ during the evaporation. The coating was chemically bonded to the substrate. The substrate was preheated to 800–1200° C. to improve bonding with the deposited material. The coated silicon nitride and SiC—SiC parts having a 50 micron thick coating survived the above-described cyclic furnace testing at 1315° C. for over 500 hours and 1000 cycles.

Although the present invention has been described above with reference to specific embodiments, it is not to be so limited. Instead, the present invention is to be construed according to the following claims.

We claim:

1. A component comprising:
   a silicon-based substrate;
   a protective coating for the substrate, the protective coating including tantalum oxide ($Ta_2O_5$) and aluminum oxide ($Al_2O_3$) for suppressing transformation from beta $Ta_2O_5$ to alpha $Ta_2O_5$;
   wherein the aluminum oxide ($Al_2O_3$) concentration is as low as 11 mol %;
   wherein the coating further includes an oxide, compound, or precursor chosen from the group consisting of Hf, Si, Ln (rare earth including whole lanthanum series and yttrium) Mg, Mo, Ni, Nb, Sr, and Ti.

2. The component according to claim 1, wherein the coating further includes an additive selected from the group consisting of nitrides, carbides, borides and silicides.

3. The component according to claim 1, wherein the substrate is one of a silicon nitride substrate and a silicon carbide substrate.

4. A component, comprising:
   a substrate formed of silicon nitride or silicon carbide; and
   a protective coating of crystalline composition on an outer surface of the substrate;
   the protective coating including a mixture of tantalum oxide ($Ta_2O_5$) and $La_2O_3$;
   wherein the $La_2O_3$ concentration is in the range of about 1–10 mol %.

5. A component, comprising:
   a substrate formed of silicon nitride or silicon carbide; and
   a protective coating of crystalline composition on an outer surface of the substrate;
   the protective coating including a mixture of tantalum oxide ($Ta_2O_5$) and an additive of at least one of $Al_2O_3$ and $La_2O_3$;
   wherein the $La_2O_3$ concentration is in the range of about 1–10 mol %; and
   wherein the coating has needle-shaped $La_2O_3$–$Ta_2O_5$ precipitates.

6. A component comprising:
   a silicon-based substrate;
   a protective coating for the substrate, the protective coating including tantalum oxide ($Ta_2O_5$) and aluminum oxide ($Al_2O_3$) for suppressing transformation from beta $Ta_2O_5$ to alpha $Ta_2O_5$; and
   wherein the aluminum oxide ($Al_2O_3$) concentration is as low as 11 mol %;
   wherein the coating further includes an additive selected from the group consisting of carbides, borides and suicides.

7. A component comprising:
   a silicon-based substrate; and
   a protective coating for the substrate, the protective coating including tantalum oxide ($Ta_2O_5$) and $La_2O_3$ for suppressing transformation from beta $Ta_2O_5$ to alpha $Ta_2O_5$, the $La_2O_3$ being in the range of about 1–10 mol % before application of the coating.

8. The component according to claim 7, wherein the silicon-based substrate is one of a silicon nitride substrate and a silicon carbide substrate.

9. A component comprising:
   a silicon-based substrate; and
   a protective coating for the substrate, the protective coating including tantalum oxide ($Ta_2O_5$) and $La_2O_3$ for suppressing transformation from beta $Ta_2O_5$ to alpha $Ta_2O_5$, the $La_2O_3$ being in the range of about 1–10 mol % before application of the coating;
   wherein the protective coating further includes aluminum oxide ($Al_2O_3$).

10. The component according to claim 9, wherein the aluminum oxide is in the range of about 1–50 mol % before application of the coating.

11. The component according to claim 9, wherein the aluminum oxide is in the range of about 1–50 mol % after application of the coating.

12. A component, comprising:
    a substrate formed of silicon nitride or silicon carbide; and
    a protective coating of crystalline composition on an outer surface of the substrate; and
    the protective coating including a mixture of tantalum oxide ($Ta_2O_5$) and $La_2O_3$;

wherein the $La_2O_3$ concentration is in the range of about 1–10 mol %.

13. The component in claim 12, wherein the coating further comprises $Al_2O_3$ in the range of 1–11 mol %.

14. The component in claim 12, wherein the protective coating has needle-shaped $La_2O_3$–$Ta_2O_3$ precipitates.

15. A component, comprising:
a substrate formed of silicon nitride or silicon carbide; and
a thermal protective coating of crystalline composition on an outer surface of the substrate; and
the thermal protective coating including a mixture of tantalum oxide ($Ta_2O_5$) and $La_2O_3$; and
wherein a surface of the thermal protective coating has needle-shaped $La_2O_3$–$Ta_2O_5$ precipitates.

16. A method of protecting a silicon nitride ($Si_3N_4$) or silicon carbide (SiC) substrate against repeated thermal cycles at elevated temperatures, the method comprising:
mixing $La_2O_3$ in the range of about 1–10 mol % with a quantity of tantalum oxide ($Ta_2O_5$) powder;
preheating the mixture; and
applying the heated mixture to the substrate.

17. A component comprising:
a silicon-based substrate;
a protective coating for the substrate, the protective coating including tantalum oxide ($Ta_2O_5$) and an additive for suppressing transformation from beta $Ta_2O_5$ to alpha $Ta_2O_5$;
wherein the additive includes $La_2O_3$ in a concentration in the range of about 1–10 mol % after application of the coating.

18. A method of protecting a silicon nitride ($Si_3N_4$) or silicon carbide (SiC) substrate against repeated thermal cycles at elevated temperatures, the method comprising:
mixing $La_2O_3$ with a quantity of tantalum oxide ($Ta_2O_5$) powder;
preheating the mixture; and
applying the heated mixture to the substrate;
wherein the $La_2O_3$ concentration before applying the heated mixture to the substrate is in the range of about 1–10 mol %.

19. A method of applying a protective coating onto a silicon-based substrate, the method comprising:
mixing $Ta_2O_5$ powder with $La_2O_3$ powder to create a ceramic mixture;
roughening the silicon-based substrate surface;
degreasing the silicon-based substrate surface;
preheating the silicon-based substrate to about 1000° C.;
applying the ceramic mixture onto the silicon-based substrate surface with an air-plasma spraying process;
melting the ceramic mixture;
quenching the silicon-based substrate; and
solidifying the ceramic mixture into a protective coating.

20. The method of claim 19, wherein the silicon-based substrate comprises silicon nitride ($Si_3N_4$).

21. The method of claim 19, wherein the silicon-substrate comprises silicon carbide (SiC).

22. The method of claim 19, wherein the protective coating thickness is in the range of about 50 microns to about 250 microns.

23. The method of claim 19, wherein the $La_2O_3$ concentration is in the range of about 3 mol % to about 10 mol % before applying the ceramic mixture onto the silicon-based substrate.

24. A component comprising:
a silicon-based substrate;
a protective coating for the substrate, the protective coating including tantalum oxide ($Ta_2O_5$) and aluminum oxide ($Al_2O_3$) for suppressing transformation from beta $Ta_2O_5$ to alpha $Ta_2O_5$;
wherein the protective coating is substantially crystalline;
wherein the protective coating further includes an oxide, compound, or precursor chosen from the group consisting of Hf, Si, Ln (rare earth including whole lanthanum series and yttrium), Mg, Mo, Ni, Nb, Sr, and Ti; and
wherein the protective coating further includes an additive selected from the group consisting of nitrides, carbides, borides and silicides.

25. A component comprising:
a silicon-based substrate;
a protective coating for the substrate, the protective coating including tantalum oxide ($Ta_2O_5$) and aluminum oxide ($Al_2O_3$) for suppressing transformation from beta $Ta_2O_5$ to alpha $Ta_2O_5$; and
wherein the protective coating is substantially crystalline;
wherein the coating further includes an additive selected from the group consisting of carbides, borides and silicides.

* * * * *